(12) United States Patent
Yan et al.

(10) Patent No.: US 10,938,434 B2
(45) Date of Patent: Mar. 2, 2021

(54) CURVED GLASS HOUSING AND MOBILE TERMINAL

(71) Applicant: AAC Acoustic Technologies (Shenzhen) Co., Ltd., Shenzhen (CN)

(72) Inventors: Xudong Yan, Shenzhen (CN); Yong You, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/695,088

(22) Filed: Nov. 25, 2019

(65) Prior Publication Data

US 2020/0169282 A1 May 28, 2020

(30) Foreign Application Priority Data

Nov. 27, 2018 (CN) .......................... 201821969381.4

(51) Int. Cl.
*H04M 1/00* (2006.01)
*H04B 1/3888* (2015.01)
*H04M 1/02* (2006.01)

(52) U.S. Cl.
CPC ........ *H04B 1/3888* (2013.01); *H04M 1/0202* (2013.01)

(58) Field of Classification Search
None
See application file for complete search history.

(56) References Cited

U.S. PATENT DOCUMENTS

| 10,133,156 | B2* | 11/2018 | Pilliod | G03B 15/05 |
| 2011/0279917 | A1* | 11/2011 | Zhao | B29C 45/0053 |
| | | | | 359/869 |
| 2013/0083388 | A1* | 4/2013 | Rawlings | G02F 1/1533 |
| | | | | 359/267 |
| 2017/0013731 | A1* | 1/2017 | Lee | H05K 5/0017 |
| 2018/0126704 | A1* | 5/2018 | Zhang | G06F 3/041 |
| 2019/0158641 | A1* | 5/2019 | Kim | H04M 1/0266 |
| 2019/0339746 | A1* | 11/2019 | Kim | H04N 5/2257 |

* cited by examiner

*Primary Examiner* — Anthony Q Edwards
*Assistant Examiner* — Rashen E Morrison
(74) *Attorney, Agent, or Firm* — W&G Law Group LLP

(57) ABSTRACT

The present application discloses a curved glass housing. The curved glass housing includes a bottom wall and an annular side wall extending arcuately from an edge of the bottom wall, and the side wall and the bottom wall cooperatively form a receiving cavity having an opening. A texture structure is defined on the bottom wall or the side wall. The texture structure comprises a dent defined on the bottom wall or the side wall and towards the receiving cavity, or the texture structure comprises a protrusion defined on the bottom wall or the side wall and away from the receiving cavity. A mobile terminal using the curved glass housing is also provided.

16 Claims, 5 Drawing Sheets

CURVED GLASS HOUSING AND MOBILE TERMINAL

FIELD OF THE PRESENT DISCLOSURE

The present disclosure relates to the field of curved glass, and more particularly to a curved glass housing and a mobile terminal.

DESCRIPTION OF RELATED ART

As a new product of glass, curved glass can protect mobile terminal better, make thermal diffusing of the mobile terminal efficiently, and has pretty colors and appearance, thus is attractive to users. Curved glass housings have been applied to more and more mobile terminals along with the gradually grown technology of manufacturing curved glasses.

In related art, in order to adapt the design of keys for the mobile terminal, such as voice keys and power keys, and so on, through holes may be defined in a side wall of the curved glass housing. The function keys may include a pressing member, an elastic member, and a sensing chip, the pressing member passes through the through hole to connect with the elastic member. When the pressing member is pressed, the elastic member is drove to move to produce a pressing signal, which can be detected by the sensing chip, thereby achieving voice adjustment or power on/off for the mobile terminal. A certain gap between the pressing member and the through hole is needed to ensure the move of the pressing member while being pressed, however, waterproofness of the mobile terminal may be badly affected as the existing of the gap. Further, the elastic member is commonly made of silica gel having a limited working life, which would cause a non-elastic deformation of the elastic member after it is long time used, making the keys cannot normally afford their functions.

Therefore, it is desirable to provide a new curved glass housing and a mobile terminal to overcome the above-mentioned problems.

BRIEF DESCRIPTION OF THE DRAWINGS

To clearly illustrate the technical solutions that are reflected in various embodiments according to this disclosure, the accompanying drawings intended for the description of the embodiments herein will now be briefly described. It is evident that the accompanying drawings listed in the following description show merely some embodiments according to this disclosure, and that those having ordinary skill in the art will be able to obtain other drawings based on the arrangements shown in these drawings without making inventive efforts.

DETAILED DESCRIPTION OF THE EXEMPLARY EMBODIMENT

The technical solutions of the embodiment of the present disclosure will be clearly and completely described in the following with reference to the accompanying drawings. It is obvious that the embodiment to be described are only a part rather than all of the embodiments of the present disclosure. All other embodiments obtained by persons skilled in the art based on the embodiment of the present disclosure without creative efforts shall fall within the protection scope of the present disclosure.

Figure 1:
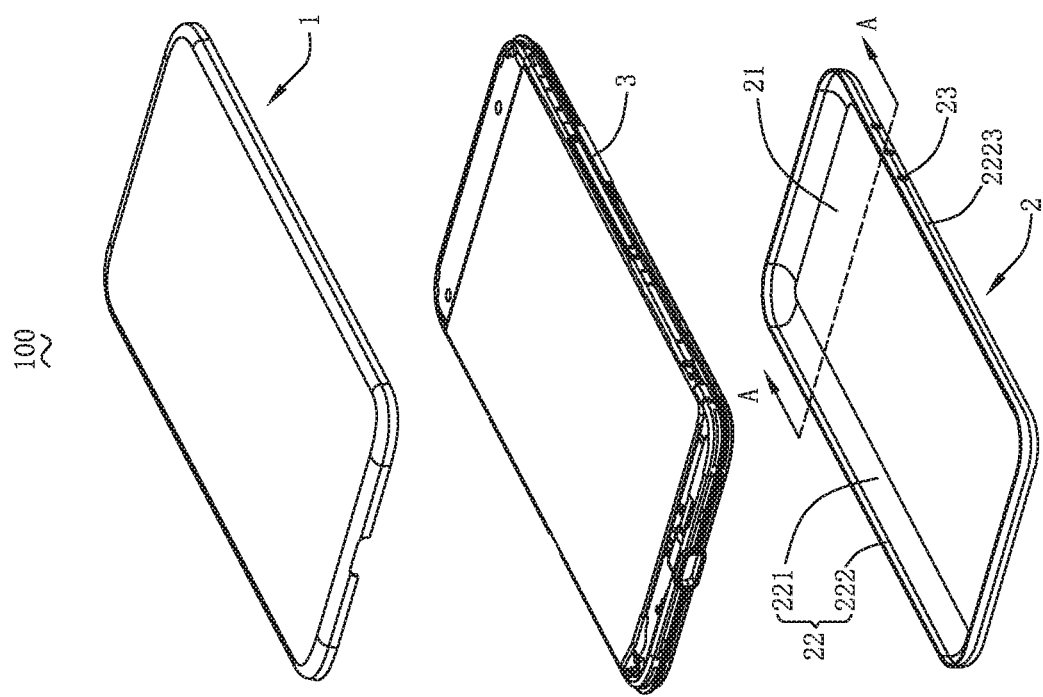
FIG. 1 is a perspective view of a mobile terminal in accordance with an embodiment of the present disclosure.

Referring to FIG. 1, a mobile terminal 100 is provided. The mobile terminal 100 comprises a screen 1, a curved glass housing 2, and a sensor 3. The screen 1 and the curved glass housing 2 cooperatively form an accommodating cavity, and the sensor 3 is accommodated in the accommodating cavity and close to the curved glass housing 2.

The curved glass housing 2 may be made of 2.5D glass or 3D glass. That is, the curved glass housing 2 may protect the mobile terminal 100 better, make thermal diffusing of the mobile terminal 100 efficiently, and has pretty colors and appearance, thus it is attractive to users. In the exemplary embodiment, 3D glass is selected.

Figure 2:
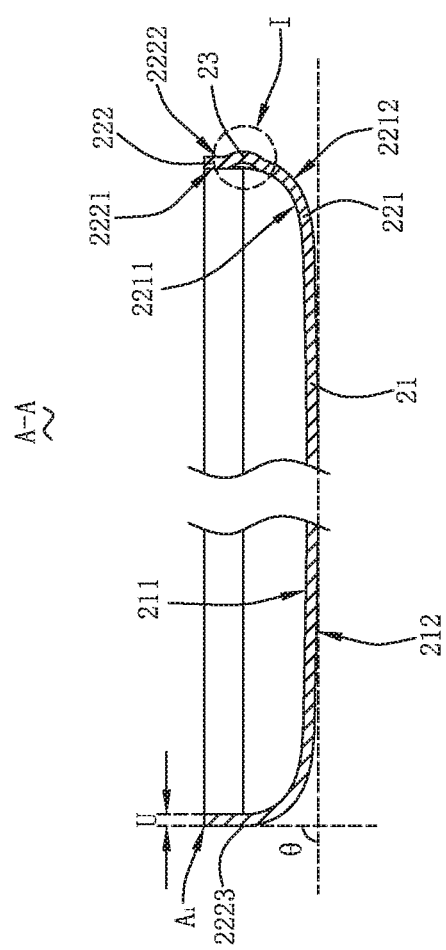
FIG. 2 is a cross-sectional view of a curved glass housing shown in FIG. 1 taken along line A-A.

Referring to FIG. 2, the curved glass housing 2 comprises a bottom wall 21, an annular side wall 22 extending arcuately from an edge of the bottom wall 21, and a texture structure 23. The texture structure 23 may be defined on the bottom wall 21 or the side wall 22. The side wall 22 is arcuately connected to the bottom wall 21, and the side wall 22 and the bottom wall 21 cooperatively form a receiving cavity having an opening. It should be understood that, the opening is towards the screen 1, and the receiving cavity communicates with the inner space of the mobile terminal 100, thus other elements of the mobile terminal 100 can be received in the receiving cavity.

The bottom wall 21, the side wall 22, and the texture structure 23 are integrated formed by a glass substrate. The integrated structure has a high structural stability and stress tolerance. Further, such an integrated structure can avoid trepanning in side walls of the curved glass housing as required in the related art, which effectively improves the waterproofness of the mobile terminal 100.

The bottom wall 21 may be flat plate shaped, includes a third inner surface 211 and a third outer surface 212 opposite to the third inner surface 211. The third inner surface 211 is the surface facing the screen 1, and the third outer surface 212 is the outer surface of the mobile terminal 100.

In the embodiment, the third outer surface 212 is a cambered surface, which is more ergonomic, holding comfortable for users, and can beautify the appearance of the curved glass housing 2. In other embodiments, the third outer surface 212 may also be a flat surface.

The side wall 22 includes an annular transition wall 221 extending arcuately from an edge of the bottom wall 21 and an annular extending wall 222 extending arcuately from the transition wall 221. The transition wall 221 has one end being arcuately connected to the bottom wall 21 and the other end being arcuately connected to the extending wall 222.

The transition wall 221 includes a second inner surface 2211 and a second outer surface 2212 opposite to the second inner surface 2211, the second inner surface 2211 arcuately connects the third inner surface 211, and the second outer surface 2212 arcuately connects the third outer surface 212.

The extending wall 222 includes a first inner surface 2221 towards the receiving cavity and a first outer surface 2222 opposite to the first inner surface 2221.

Figure 5:
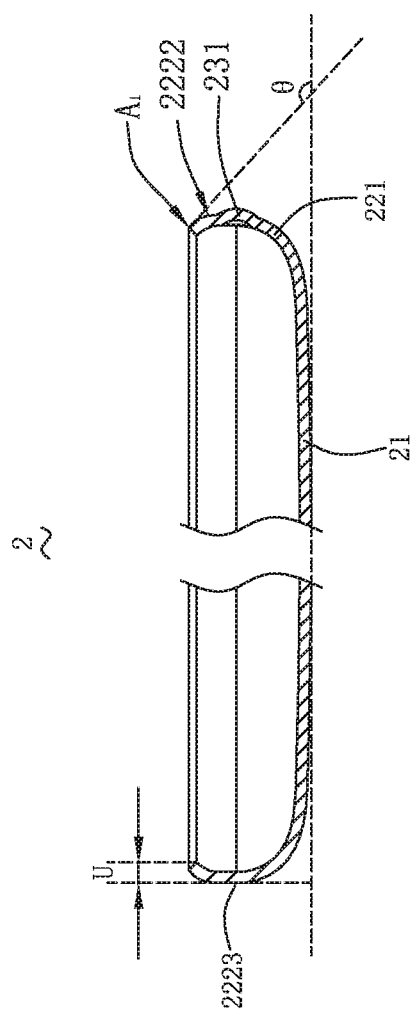
FIG. 5 is another structural diagram of the curved glass housing in FIG. 2.

Referring to FIG. 2 and FIG. 5, the first outer surface 2222 includes a first endpoint $A_1$ away from the bottom wall 21. An external angle recorded as θ formed between the tangential direction of the first outer surface 2222 at the first endpoint A₁ and the horizontal direction is larger than or equal to 90 degrees and is less than or equal to 180 degrees. It should be noted, the external angle is the angle located at the side away from the receiving cavity, and the horizontal direction refers to the tangential direction at the lowest point of the third outer surface 212 in FIG. 2.

Referring to FIG. 2, the external angle θ is equal to 90 degrees, that is, the extending wall 222 extends vertically, namely the longitudinal section of the extending wall 222 is rectangular.

Referring to FIG. 5, the external angle θ is in a range from larger than 90 degrees and less than or equal to 180 degrees, that is, one end of the extending wall 222 away from the transition wall 221 extends arcuately to form a backoff structure, which shrinks the opening of the receiving cavity defined by the bottom wall 21 and the side wall 22 to form a shrinking hollow structure having a small opening and a large cavity. As such, other elements of the mobile terminal 100 can be effectively and easily fixed in the receiving cavity. In the embodiment, the external angle θ is larger than or equal to 110 degrees and less than or equal to 180 degrees.

Further, the first outer surface 2222 also includes an annular connecting side 2223 connected to the transition wall 221. The tangential direction of the first outer surface 2222 at the connecting side 2223 is perpendicular to the horizon direction.

The first inner surface 2221 includes a second endpoint A₂ away from the bottom wall 21. A perpendicular distance between the second endpoint A₂ and the tangent line of the first outer surface 2222 at the connecting side 2223 is recorded as "U", then "U" is larger than or equal to 0.15 millimeter and is less than or equal to 1 millimeter. For curved glass housings in different models, the values of "U" can be adjusted to ensure fixing the other elements of the mobile terminal 100 effectively.

Figure 3:
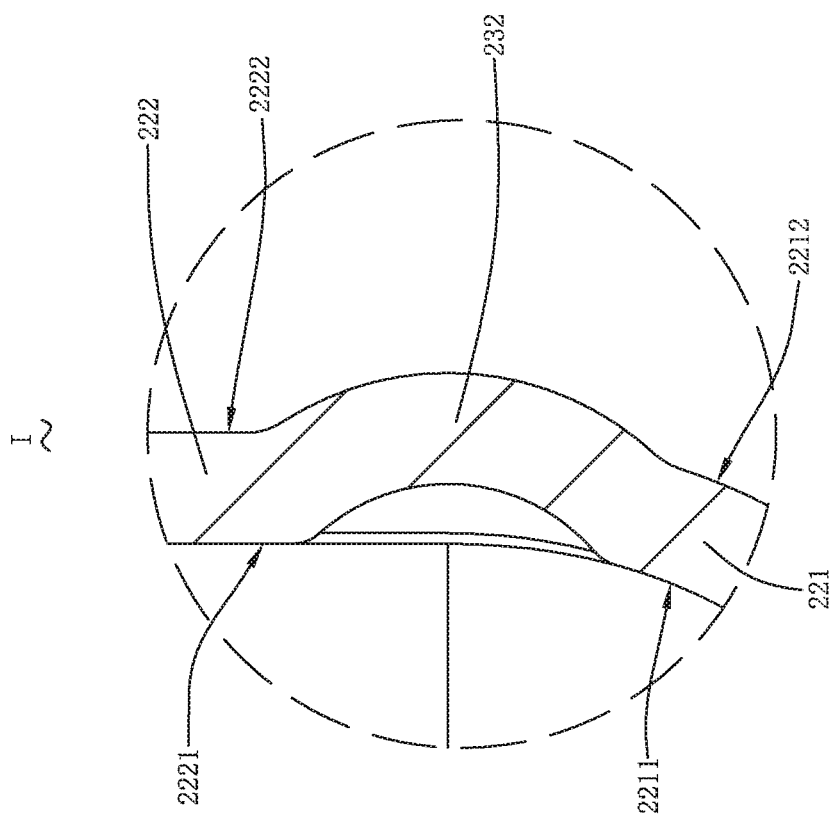
FIG. 3 is an enlarged view of portion I in FIG. 2.
Figure 4:
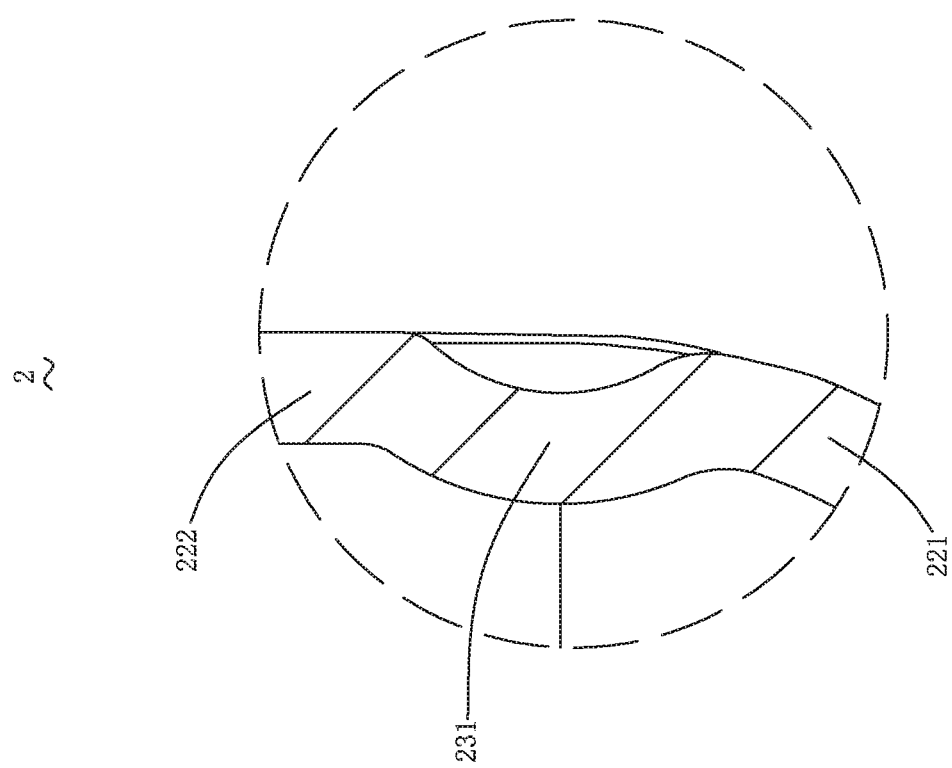
FIG. 4 shows another structure of a texture structure in FIG. 3.

Referring to FIG. 3 and FIG. 4, the texture structure 23 includes a dent 231 defined by the bottom wall 21 or the side wall 22 recessed towards the receiving cavity, or the texture structure 23 includes a protrusion 232 defined on the bottom wall 21 or the side wall 22 protruded away from the receiving cavity. That is, the dent 231 or the protrusion 232 can be defined on the bottom wall 21 or the side wall 22. In the embodiment, the dent 231 or the protrusion 232 is defined at the joint of the transition wall 221 and the extending wall 222 and is symmetric about the connecting side 2223.

Further, the wall of the dent 231 has a thickness being equal to that of the transition wall 221, or a thickness of the protrusion 232 is equal to the thickness of the transition wall 221. That is, extra material is not needed in forming the dent 231 or the protrusion 232.

A projection shape of the dent 231 along its recessed direction or a projection shape of the protrusion 232 along its protruding direction is one or more selected from a group consisting of a triangle, a strip, a square shape, and a dot shape. In the embodiment, the texture structure 23 includes three protrusions 232 which are arranged isometrically in a line. The projection shape of each of the three protrusions 232 along the protruding direction is a dot shape. In other embodiments, the texture structure 23 may include protrusion 232 only, or the texture structure 23 includes the combination of the dent 231 and the protrusion 232.

The screen 1 and the curved glass housing 2 cooperatively form the accommodating cavity, and the sensor 3 is accommodated in the accommodating cavity and corresponding to the dent 231 or the protrusion 232 to receive touching signal from the dent 231 or the protrusion 232. The dent 231 or the protrusion 232 may be used as a voice key, a power key, or a mute key.

Specifically, in the embodiment, the protrusion 232 matches with the sensor 3, and the matching of the protrusion 232 with the sensor 3 plays a role of the function keys as that in the related art, thus can replace the mechanical function keys of the related art. There is a first sensing capacitor existing between the protrusion 232 and the ground, when user's finger approaches to the protrusion 232, a second sensing capacitor is formed between the finger and the ground to connect in parallel with the first sensing capacitor, so that the total sensing capacitance increases. After detecting the change of the total sensing capacitance, the sensor 3 outputs a determination signal corresponding to a certain protrusion 232 that is pressed to the main board of the mobile terminal 100, to implement the functions such as volume adjustment or power switch.

Further, the dent 231 or the protrusion 232 can be easily seen and touched, which improves the touch accuracy of the dent 231 or the protrusion 232 during in operation. It should be understood that, the dent 231 or the protrusion 232 may also be defined with identifying patterns or marks on its outer surface to further improve the touch accuracy and avoid mis-operation for users. The dent 231 or the protrusion 232 of the present disclosure has a simple structure, and does not need to move during in use, no loss existed in use, so the service life of the dent 231 or the protrusion 232 is longer.

In the embodiment, the protrusion 232 is defined with identifying marks, for example, "+" represents for voice enhancing, "−" represents for voice decreasing, and "⏻" represents power key.

Compared to the related art, in the present disclosure, the bottom wall 21 or the side wall 22 of the curved glass housing 2 of the mobile terminal 100 is defined with the texture structure 23 that is integrated with the bottom wall 21 or the side wall 22, thus the waterproofness of the mobile terminal 100 is effectively improved. Moreover, such an integrated structure has a high structural stability and a pretty appearance. Further, the matching of the texture structure 23 with the sensor 3 plays a role of the function keys as that in related art, thus can replace the mechanical function keys of the related art. Such a configuration can prolong the service life of the new function keys as there is no consumption in use of the new function keys.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A curved glass housing, comprising: a bottom wall; and an annular side wall extending arcuately from an edge of the bottom wall, the side wall and the bottom wall cooperatively forming a receiving cavity having an opening; wherein a texture structure is defined on the bottom wall of the curved glass housing; the texture structure comprises a protrusion defined on the bottom wall by the bottom wall protruding away from the receiving cavity; wherein the side wall comprises an annular transition wall extending arcuately from an edge of the bottom wall and an annular extending wall extending arcuately from an edge of the transition wall and the extending wall comprises a first inner surface towards the receiving cavity and a first outer surface opposite to the first inner surface: the first outer surface comprises a first endpoint away from the bottom wall an external angle recorded as Θ formed between the tangential direction of the first outer surface at the first endpoint and the horizontal direction is larger than or equal to 90 degrees and is less than or equal to 180 degrees: wherein the external angle recorded as Θ is larger than 90 degrees and less than or equal to 180 degrees, and one end of the extending wall away from the transition wall extends arcuately to form a back off structure.

2. The curved glass housing according to claim 1 wherein the external angle recorded as Θ is equal to 90 degrees.

3. The curved glass housing according to claim 1, wherein the external angle recorded as θ is larger than or equal to 110 degrees and less than or equal to 180 degrees.

4. The curved glass housing according to claim 1, wherein the first outer surface further comprises an annular connecting side connected to the transition wall, the tangential direction of the first outer surface at the connecting side is perpendicular to the horizon direction, and the dent or protrusion is symmetric about the connecting side.

5. The curved glass housing according to claim 4, wherein the first inner surface comprises a second endpoint away from the bottom wall, a perpendicular distance between the second endpoint and the tangent line of the first outer surface at the connecting side is larger than or equal to 0.15 millimeter and is less than or equal to 1 millimeter.

6. The curved glass housing according to claim 4, wherein a thickness of the bottom wall, a thickness of the transition wall, and a thickness of the extending wall are equal to each other.

7. The curved glass housing according to claim 4, wherein the wall of the dent has a thickness being equal to the thickness of the extending wall, or a thickness of the protrusion is equal to the thickness of the extending wall.

8. The curved glass housing according to claim 1, wherein a projection shape of the protrusion along its protruding direction is a dot shape.

9. The curved glass housing according to claim 8, wherein the projection shape of the protrusion along protruding direction thereof is a dot shape.

10. The curved glass housing according to claim 1, wherein the curved glass housing is made of 2.5D glass or 3D glass.

11. A mobile terminal, comprising a screen; a sensor; and a curved glass housing, the curved glass housing comprising a bottom wall; and an annular side wall extending arcuately from an edge of the bottom wall, the side wall and the bottom wall cooperatively forming a receiving cavity having an opening; wherein; a texture structure is defined on the bottom wall of the curved glass housing; the texture structure comprises a protrusion defined on the bottom wall by the bottom wall protruding away from the receiving cavity; the screen and the curved glass housing cooperatively form an accommodating cavity, the sensor is received in the accommodating cavity and corresponding to the protrusion, and the sensor is configured to receive touching signal from the protrusion; wherein the side wall comprises an annular transition wall extending arcuately from an edge of the bottom wall and an annular extending wall extending arcuately from an edge of the transition wall and the extending wall comprises a first inner surface towards the receiving cavity and a first outer surface opposite to the first inner surface; the first outer surface comprises a first endpoint away from the bottom wall an external angle recorded as formed between the tangential direction of the first outer surface at the first endpoint and the horizontal direction is larger than or equal to 90 degrees and is less than or equal to 180 degrees; wherein the external angle recorded as Θ is larger than 90 degrees and less than or equal to 180 degrees, and one end of the extending wall away from the transition wall extends arcuately to form a back off structure.

12. The mobile terminal according to claim 11, wherein the dent or the protrusion is a voice key, a power key, or a mute key.

13. The mobile terminal according to claim 11, wherein the first outer surface further comprises an annular connecting side connected to the transition wall, the tangential direction of the first outer surface at the connecting side is perpendicular to the horizon direction, and the dent or protrusion is symmetric about the connecting side.

14. The mobile terminal according to claim 13, wherein the wall of the dent has a thickness being equal to the thickness of the extending wall, or a thickness of the protrusion is equal to the thickness of the extending wall.

15. The mobile terminal according to claim 11, wherein a projection shape of the dent along its recessed direction or an projection shape of the protrusion along its protruding direction is one or more selected from a group consisting of a triangle, a strip, a square shape, and a dot shape.

16. The mobile terminal according to claim 15, wherein the projection shape of the dent along its recessed direction or the projection shape of the protrusion along its protruding direction is a dot shape.

* * * * *